May 5, 1953  J. E. STRATMAN  2,637,564
IMPLEMENT LIFT
Filed Oct. 8, 1949  2 SHEETS—SHEET 1

INVENTOR.
John E. Stratman,
BY
Schroeder, Merriam, Hofgren & Brady
Attys.

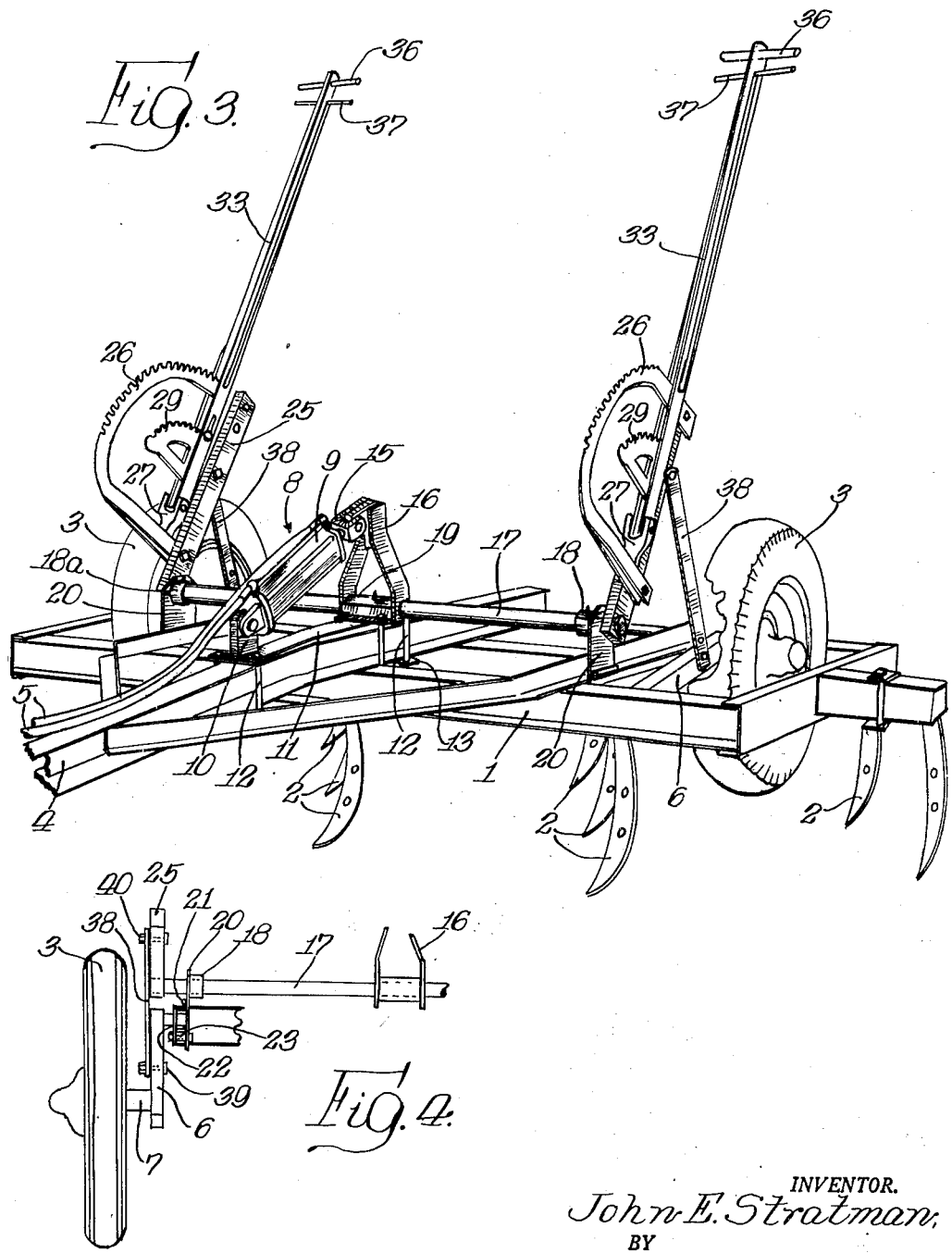

Patented May 5, 1953

2,637,564

UNITED STATES PATENT OFFICE 2,637,564

IMPLEMENT LIFT

John E. Stratman, Holdrege, Nebr.

Application October 8, 1949, Serial No. 120,359

2 Claims. (Cl. 280—6)

This invention relates to an implement lift and more particularly to a power operated lift for use with plows and other farming implements to raise and lower the wheels relative to the implement.

An object of this invention is to provide a new and improved power operated implement lift capable of moving a pair of wheels relative to the implement simultaneously under all operating conditions.

Another object is the provision of a device of the character described adapted to be readily mounted upon implements previously having only manual controls.

Another object is the provision of a power operated implement lift having means manually operable to position each wheel independently relative to the implement to support the implement in a horizontal plane even though the wheels thereof may travel on surfaces which are uneven, as characterized by one wheel traveling in a furrow or the like.

Yet another object of this invention is the provision of a power operated implement lift having means for rendering the power actuating mechanism inoperative in case of failure of said power, leaving manual controls for raising and lowering the wheels of the implement.

A further object is the provision of a new and improved implement lift having means for locking the wheels in their lowered position to insure against accidental lowering of the implement while transporting the implement from place to place.

Other objects and advantages of this invention will become apparent as the description progresses taken in connection with the accompanying drawings, in which:

Fig. 3 is a perspective view of the implement shown in Fig. 1 illustrating the wheels of the implement in their raised position as the result of actuating the power operated mechanism;

Fig. 4 is a fragmentary detailed end view showing the mounting of a wheel and the adjacent wheel lifting device of this invention.

Figure 1:
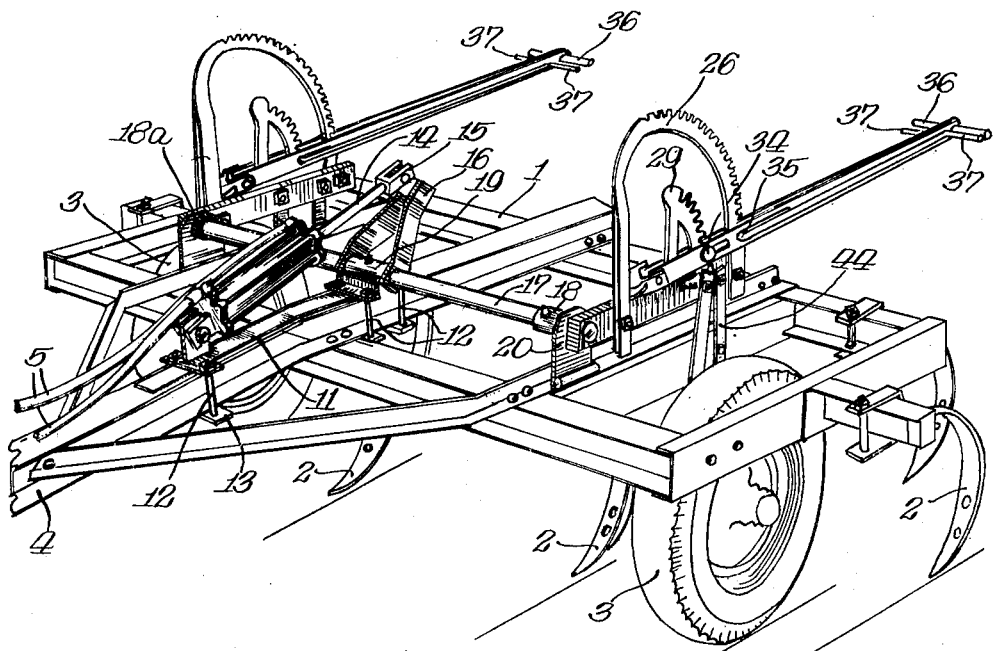
Fig. 1 is a perspective view of a cultivator implement with the power operated implement lift mounted thereon.

While my invention is susceptible of embodiment in many different forms, I have shown in the drawings and will herein describe in detail one specific embodiment, with the understanding that the present disclosure is to be considered as an exemplification of the principles of the invention and is not intended to limit the invention to the embodiments illustrated. The scope of the invention will be pointed out in the appended claims.

In providing a power actuated wheel lift for a farming implement, it is important that the implement be raised from the ground evenly at both its sides, such as when reaching the end of a furrow and at the same time means should be provided for differentially spacing the wheels vertically relative to the implement in order to maintain the implement level even though a wheel may run in a furrow.

In the embodiment illustrated in the drawings an implement frame 1 is provided with a plurality of ground engaging members 2 and is supported on a pair of transversely spaced wheels 3. The frame 1 is provided with a tongue 4, suitably braced against lateral movement by angle irons, for attaching the implement to a tractor or other pulling mechanism (not shown). Each wheel 3 is independently mounted on a bar 6 (as best seen in Figs. 3 and 4) pivoted at one end to the frame 1 of the implement and carrying the wheel 3 on a suitable hub 7 positioned near the opposite end of the bar 6.

Mechanism is provided for raising or lowering the wheels simultaneously or independently, for actuating the same manually or by power means, and for locking the wheels in fixed position relative to the frame during transportation of the implement. Herein this mechanism includes a power operated fluid motor generally designated 8. Preferably the motor 8 is of the piston and cylinder type having a cylinder 9 pivotally mounted at one end on an upstanding lug 10 of a mounting plate 11. The mounting plate is adapted to extend longitudinally of the tongue 4, resting on the upper surface thereof, and is secured by bolts 12 and straps 13.

Reciprocable within the cylinder is a piston having a rod 14 projecting through the free (i. e. not pivoted) end of the cylinder. The piston rod 14 terminates in a clevis 15 for pivotal connection to a crank 16 for a purpose presently to be described. Fluid under pressure is supplied to opposite ends of the cylinder 9 by flexible conduits 5 connected to a fluid pressure source usually driven from the tractor pulling the implement.

Extending transversely of the frame 1 is a shaft 17 journalled in end bearings 18 and 18a and a center bearing 19 supported on the mounting plate 11. Fast on the shaft at the center thereof is the crank 16 to rock the shaft with reciprocation of the piston of motor 8 between positions illustrated in Figs. 1 and 3. The outer bearings 18 and 18a are provided with a supporting plate 20 extending vertically above the frame 1 of the implement and attached to a channel iron 22 of the frame by a thrust bar 21 secured to the plate 20 and adapted to rest on the top of the channel 22 to bear the weight thrust upon the shaft 17. A spacer block 23 positioned between the plate 20 and the inner surface of the channel 22 maintains the plate 20 in a vertical plane relative to the channel 22, as best seen in Fig. 4.

At each end of the shaft beyond the bearing support plate 20 a wheel lift bar 25 is nonrotatably affixed at one of its ends to the shaft 17. The lift bar extends rearwardly of the shaft 17 and normal thereto to provide movement of the free end of the lift bar with the shaft as a pivot. Each lift bar 25 is positioned approximately above a wheel mounting bar 6 as best seen in Fig. 4. Thus with actuation of the fluid cylinder piston and turning of the shaft 17 about its axis, the wheel lift bars 25 may be moved between the positions illustrated in Figs. 1 and 3.

Figure 2:
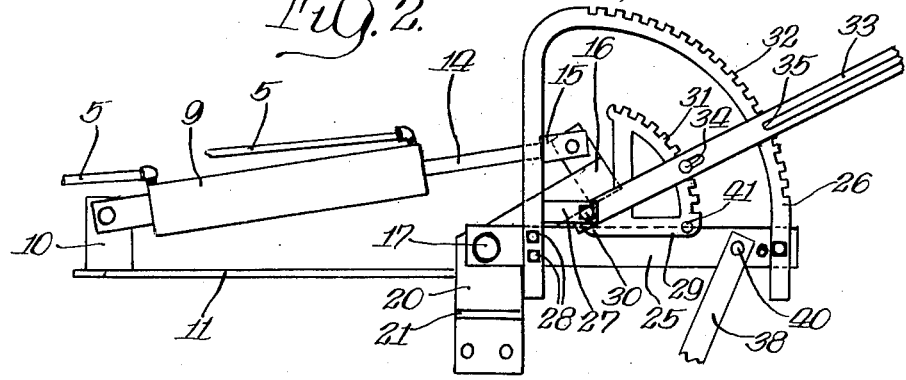
Fig. 2 is a partial detailed side view of the mechanism for raising and lowering the wheels of an implement.

As best seen in Fig. 2 an outer quadrant 26 is attached to the lift bar and extends thereabove. A clevis 27 is affixed to the lift bar near the shaft 17 and held stationary with reference to the bar by bolts 28. A smaller inner quadrant 29 is pivoted on a bolt 30 extending between the jaws of the clevis 27. The teeth 31 of the inner quadrant 29 and the teeth 32 of the outer quandrant 26 are arranged in arcs having their center of curvature at the bolt 30 held by the clevis 27. A manually operable lever 33 is pivoted at its lower end on the bolt 30 in the clevis 27. Carried by the lever 33 for releasably engaging the teeth 31 of the inner quadrant 26 and the teeth 32 of the outer quadrant 26 are dogs 34 and 35 respectively. A handle 36 is provided at the outer free end of each lever 33 and dog lifting detents 37 are provided adjacent the handle 36 for respectively disengaging the dogs from the teeth on the quadrants. It will be seen that the quadrants 26 and 29 and the lever 33 are movable with the lift bar 25 while the lever 33 and the quadrant 29 may both be manually positioned relative to the bar 25 for a purpose to be hereinafter described.

For raising and lowering the wheel support bar 6 a link 38 is connected at one end by a bolt 39 to the wheel support bar 6 and at its other end by a bolt 40 to the lift bar 25. When the link 38 is connected as above described the wheels may be raised and lowered by operating the power cylinder 8 and the extent of the raising and lowering will be governed solely by movement of the lift bars 25. Also, with this connection each wheel will be raised and lowered an equal amount relative to the frames and since each lift bar is affixed to the shaft 17 the wheels are moved relative to the implement simultaneously.

In order to obtain a differential positioning of the wheels in vertical relation to the frame, the upper end of the link 38 may be connected with a bolt or the like to an opening 41 in the lower end of the inner quadrant 29. In this position a wheel may be moved vertically relative to the lift bar 25 by releasing the dog 35 on the lever 33 from the teeth 32 of the outer quadrant 26 and manually positioning the lever 33 relative to the bar 25 simultaneously carrying the inner quadrant 29 along with the lever 33 about the pivot bolt 30 in the clevis 27. Thus, if it is desired to have one wheel positioned lower relative to the implement than the other wheel, it is only necessary to connect the link 33 to the inner quadrant 29 as above described and move the lever 33 downwardly from the position as shown in Fig. 2 to move the inner quadrant downwardly relative to the lift bar 25. It will be readily apparent that the range of adjustment can be increased by also adjusting the inner quadrant 29 relative to the lever 33. When the wheels are so differentially positioned relative to the implement, the lift bars may raise and lower the wheels upon actuating the power means and such differential positioning will be maintained. The power mechanism moves the wheels as a unit maintaining any vertical offset relation thereof.

In the event of a power failure, when the implement having the power lift mounted thereon is being used, the operator may continue with his day's work by simply rendering the power mechanism inoperative, leaving a manual control for raising the wheels. This is accomplished by securing an auxiliary strap 44 to the free end of the lift bar and to a channel member of the frame 1 of the implement. This auxiliary strap 44 thus holds the outer end of the lift bar 25 immovable relative to the implement frame 1. The wheel lift link 38 should now be connected to the inner quadrant 29, as previously described, permitting a vertical positioning of each wheel by movement of the manually operable lever 33 relative to the now stationary lift bar 25. The wheels may be positioned in a vertical plane to an extent limited by movement of the dog 35 between the extremities of the teeth 32 on the outer quadrant 26. The wheels may be further positioned beyond the arc of movement of a lever 33 along the teeth of the outer quadrant 26 by lifting the dog 34 from the teeth 31 of the inner quadrant 29 and positioning the lever 33 relative to said inner quadrant.

When it is desired to transport the implement along a road or highway it is advisable to lock the wheels in their lower position to assure against accidental dropping of the ground engaging members 2 to the roadbed. This may be accomplished by attaching the upper end of the wheel lift link 38 to the lift bar 25 as illustrated in Fig. 2 and attaching the auxiliary strap 44 as illustrated in Fig. 1. In this position the wheels may not raise without movement of the lift bars 25 and the auxiliary strap 44 maintains the lift bars immovable relative to the implement frame.

The parts comprising the implement lift may be manufactured and sold separate from the implement proper. The purchaser may attach the lift to any implement of his choice by the simple expedient of removing any manual controls on his implement and substituting the lift of this invention.

The implement lift may be adapted for use on various width plows and the like by increasing or decreasing the length of the shaft 17 to position the wheel lifting apparatus hereinafter described, adjacent the wheel supporting bars 6.

From the foregoing it is believed that I have invented a new and improved power operated implement lift provided with manual means for differentially positioning the wheels of the implement and providing for continued operativeness of the lift in the event of a power failure.

I claim:

1. A device for raising and lowering independently mounted wheels of a farming implement or the like, said device comprising a shaft journalled in bearings aligned transverse the implement, a wheel lift bar attached at one of its ends to said shaft near each wheel, said lift bars extending rearwardly of and normal to the shaft, power means attached to the shaft intermediate said lift bars for turning the shaft about its axis to raise and lower the free ends of the lift bars, an outer toothed quadrant attached to each lift bar and extending upwardly therefrom, an inner toothed quadrant pivotally connected to each lift bar and movable in a plane perpendicular to the axis of the adjacent outer quadrant, a manually operable lever pivoted to each lift bar near the end thereof attached to said shaft and having a pair of dogs respectively adapted to releasably engage said toothed quadrants, said manually operable lever being movable about its pivot in a plane parallel to the plane of movement of said lift bar between a lower position substantially parallel to the lift bar and a raised position above the lift bar, and a link connecting each inner toothed quadrant and a wheel mounting means whereby said power means may raise and lower said wheels and said manually operable levers may each further position a wheel relative to the adjacent lift bar.

2. An implement lift adapted for use on a farming implement having a pair of spaced wheels and separate wheel mounting means movable relative to the implement comprising, in combination, a shaft extending transverse the implement, a pair of wheel lift bars attached to said shaft, said lift bars extending normal to said shaft and respectively disposed above the wheel mounting means, power means for rocking said shaft to raise and lower the wheel lift bars, an outer toothed quadrant fixed to each wheel lift bar and movable therewith, a manually operable lever pivoted to each lift bar and having a first dog releasably engaging said outer toothed quadrant for positioning said lever relative to said lift bar, an inner toothed quadrant pivoted on each lift bar, a second dog carried by each manually operable lever for positioning the lever relative to said inner quadrant, and a link connecting each inner quadrant and a wheel mounting means whereby said power means may raise or lower the wheels and the manually operable levers may further position the wheels relative to each wheel lift bar.

JOHN E. STRATMAN.

References Cited in the file of this patent

UNITED STATES PATENTS

| Number | Name | Date |
| --- | --- | --- |
| 1,931,815 | Conley | Oct. 24, 1933 |
| 2,319,492 | Dewey | May 18, 1943 |
| 2,344,123 | Brown et al. | Mar. 14, 1944 |
| 2,458,091 | Moore | Jan. 4, 1949 |
| 2,482,657 | Court | Sept. 20, 1949 |
| 2,538,093 | Goode | Jan. 16, 1951 |